Patented Apr. 21, 1953

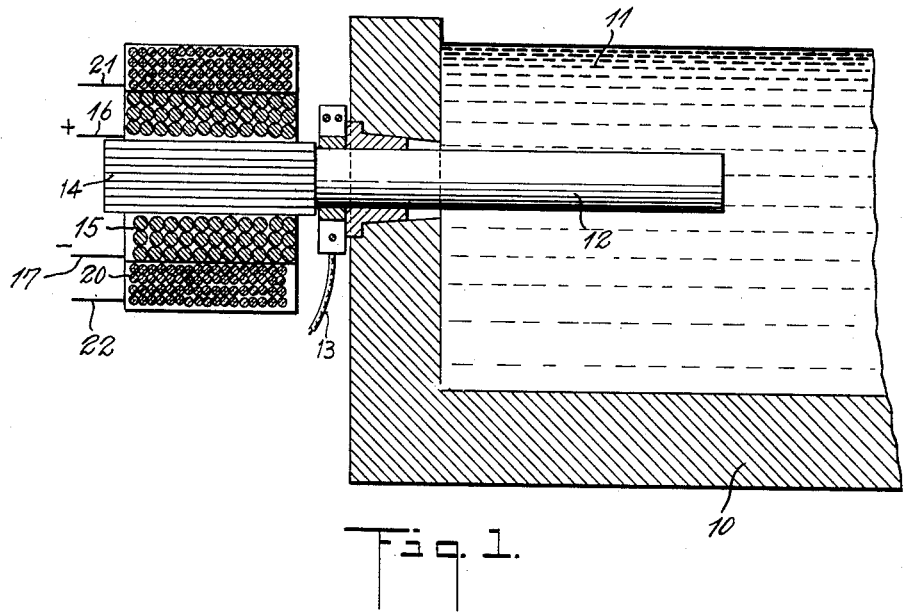
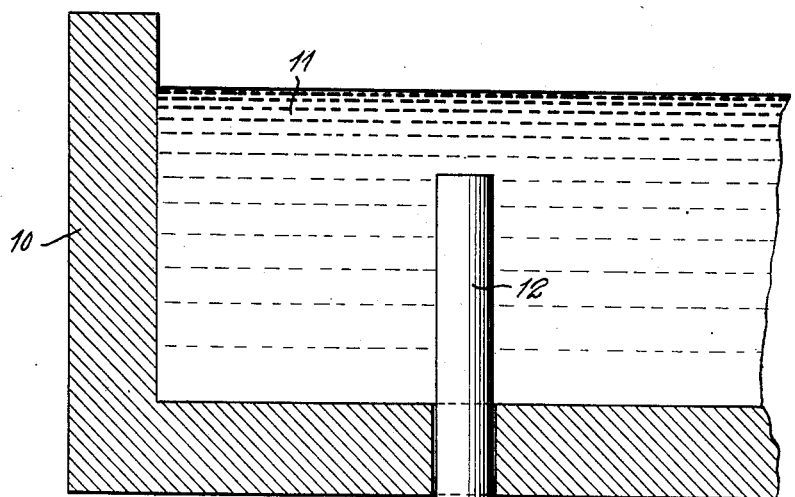
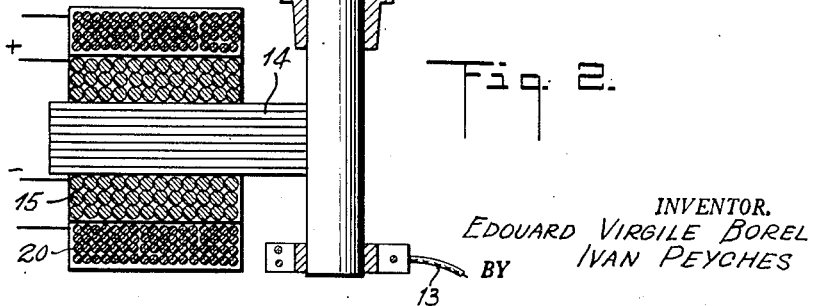

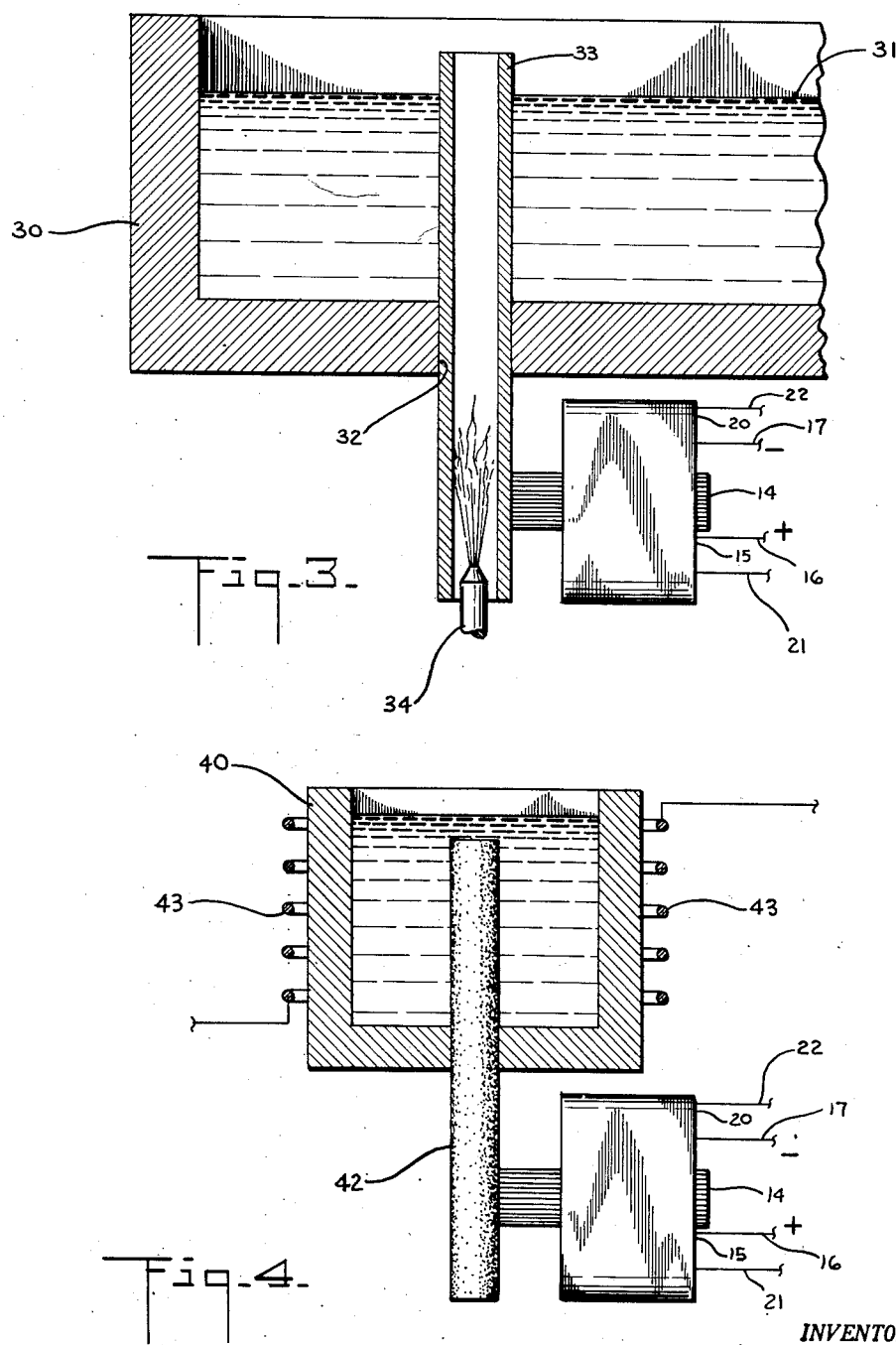

2,635,388

UNITED STATES PATENT OFFICE 2,635,388

PROCESS AND APPARATUS FOR MAKING GLASS INVOLVING HIGH-FREQUENCY VIBRATION

Ivan Peyches, Paris, France, and Edouard Virgile Borel, Vevey, Switzerland, assignors to Societe Anonyme des Manufactures des Glaces et Produits Chimiques de Saint-Gobain, Chauny & Cirey, Paris, France Application August 6, 1947, Serial No. 766,662 In France June 1, 1945

Section 1, Public Law 690, August 8, 1946 Patent expires June 1, 1965

18 Claims. (Cl. 49—53)

1

This invention relates to glassmaking. It has particular utility in the fining of melted glass and serves to speed the assembly and liberation of gas bubbles from the glass, and consequently to more quickly produce a fine, bubble-free, homogeneous glass.

In the standard continuous processes of making glass the raw materials are admitted to one end of a furnace that may be heated by flame or by electricity, being melted therein with the formation of a glass bath including substantial quantities of gases and usually some undissolved solids. In order to prepare the glass for working it is fined, being moved out of the melting zone into a hotter part of the furnace where it is raised to a temperature at which the residual solids dissolve and the gases are bubbled away from the bath. After the fining the fined glass moves to a working chamber where its temperature falls and from whence it is removed for the making of glass articles. Similar process steps are followed in furnaces of discontinuous type, except that the glass material is submitted to the different operations in sequence without changing place.

In order to accelerate the fining operation it has been proposed to employ supersonic vibrations to agitate the glass, in addition to the usual heating means.

It is an object of this invention to accelerate the fining of glass, and also to accelerate the production of glass either in discontinuous or in continuous furnaces. Another object is to produce a better and more uniform glass by an improved process. Still another object is to develop apparatus capable of contributing to the success of the process.

The process objects are accomplished, generally speaking, by a process that includes subjecting localized and limited volumes of the glass bath simultaneously to high heat and to vibration by sound waves in the audible or ultra-sonic ranges. The apparatus objects are attained by causing a heater immersed in the bath to vibrate with the periodicity required to produce vibrations of high frequency. By high frequency is meant a frequency of at least 1000 cycles per second and preferably between 10,000 and 20,000 cycles per second. The heater thus made to vibrate may be an electrode, an internally flame-heated tube, a resistor, or any submerged heating means, such for instance as a body carrying low or high frequency induction currents. Suitable means for setting a body vibrating are known and have been used in other arts. Such means may be employed upon the heater-vibrators of this invention, for instance on a part of an electrode projecting from a furnace.

There is thus produced in the glass bath in small zones close to the heater elements a sharp rise in temperature and an intense vibration. Even with a moderate expenditure of energy a very rapid fining of the entire mass of glass is obtained. Such results have not heretofore been obtained.

This result might be explained by the fact that in the zones that are near the heater-vibrators the glass becomes very fluid under the influence of high temperature, while the self same glass is subjected to agitation and to variations of pressure by the action of the vibrations of high intensity which are particularly adapted to assemble bubbles and to facilitate their escape from the bath.

Because of the existence of the hot point established in the mass of glass by the heater element, there is established in the mass convection currents that take their origin from this point and entrain a constant circulation of the glass past this point, so that practically, at the end of a certain period of time, the whole of the glass in the bath is found to have been passed through this active zone.

By that localization and that superimposing of the effects of temperature and of vibration, there are obtained results that far surpass those obtained by the expenditure of the same total quantity of thermal or vibratory energy dispersed in a uniform manner throughout the whole mass of glass.

A particularly advantageous means of accomplishing the invention is to use, as heater-vibrator, the electrodes that bring an electric current into the glass, and of which the section of contact with the bath is so small that the current density in the glass is very high near the heater-vibrator, producing in this zone of the bath as a result a sharp rise in temperature, these electrodes being also vibrated by any suitable means.

In the accompanying drawings is shown by way of illustration, diagrammatically, an apparatus corresponding to conceptions of the invention.

Fig. 1 is a diagrammatic elevational section of a part of a glass furnace showing a horizontal electrode and a representative vibrator.

Fig. 2 is a modification showing a vertical electrode.

Fig. 3 is a vertical sectional view of a tank heated by a vibratory flame tube.

Fig. 4 is a vertical section through a tank heated by induction.

In the construction according to Fig. 1 the numeral 10 indicates, diagrammatically, the furnace tank in which glass 11 is held. An electrode 12, supplied with current useful to heat the bath by lead 13, enters the furnace horizontally through the side wall. On the end of the electrode is applied a vibrating member of a high-frequency vibration generating apparatus of a suitable type, for example a magneto-strictive generating apparatus. This apparatus consists essentially, as is known, of a core formed of superposed sheets of magneto-strictive metal or alloy. About this core are two concentric coils 15, 20 of which the inner is served with direct current by leads 16—17 and the outer with high frequency alternating current by leads 21—22. The direct current winding establishes a constant magnetic field while the other carries an alternating current and generates an alternating field which is superimposed on the direct field and produces the vibration of the core and the electrode on which it is acting.

The vibrations can be transmitted longitudinally or transversely to the electrode by arranging the vibration generating apparatus as shown in Fig. 1 or as shown in Fig. 2. In Fig. 1 the vibrations are longitudinal, in Fig. 2, they are transverse.

Fig. 2 shows the application of the illustrative vibration generating apparatus to a vertical electrode of the type entering the tank from the bottom.

The vibrating heaters in the bath may be used in combination with heaters of other types located in or out of the bath.

Particularly advantageous results are obtained when the vibrated element is an electrode producing a heat concentrated zone in its neighborhood; this is the case when the surface of the electrode in contact with the glass is small compared to the section of the glass bath traversed by the electrical current between the electrodes.

In Fig. 3 is shown how a vibrating flame tube may be employed. In that figure 30 is a tank containing glass 31, through which, and through a hole 32 in the bottom of the tank a flame tube 33, heated by oil burner 34, projects. The vibrating mechanism 14, 15, 20 is identical with that of Fig. 2.

In Fig. 4 is shown an induction furnace 40, containing glass 41, and a graphite core 42 which extends through the bottom of the tank and supports the vibratory mechanism of Fig. 2. An induction coil 43 encircles the tank 40.

In the case of both Figs. 3 and 4, the invention includes a heating element, in Fig. 3 the flame tube and in Fig. 4 the core, which is vibrated.

An advantage of the invention lies in the more rapid accomplishment of the glassmaking process, which is particularly accomplished by the acceleration of the fining step. Another advantage is in the speed and completeness with which the bubbles of gas are assembled and freed from the bath. Another advantage is in the employment of elements which are at one and the same time heating bodies and bodies which are caused to vibrate, and in the particularly sharp rise in temperature which occurs in combination with a particularly vigorous agitation of the hottest glass to produce results of perfection not heretofore believed to have been attained. The useful and simple apparatus is advantageous.

As many apparently widely different embodiments of the present invention may be made without departing from the spirit and scope thereof, it is to be understood that the invention is not limited to the specific embodiments, except as defined in the appended claims.

What is claimed is:

1. The process of glassmaking that includes the step of applying to a localized and limited volume of a glass bath simultaneous heating and vibrations having a frequency in the audio range.

2. The process of glass making that includes the step of subjecting a glass bath to heating and to vibrations having a frequency of 10,000-20,000 cycles per second, both heat and vibrations being imparted to the glass by a body of small volume compared to the volume of the bath, whereby to cause simultaneous and intense local heating and vibration of a relatively small part of the bath and a relatively rapid and progressive subjection of all the glass in the bath to the same treatment by means of convection currents generated in the glass by the said body of small volume.

3. Apparatus for glassmaking that includes a tank capable of holding a glass bath, an electrode extending into the space occupied by the bath, and vibratory means of high frequency type applied to the electrode whereby to agitate the bath through the electrode.

4. Apparatus for glassmaking that includes a tank capable of holding a glass bath, a heater extending into the space occupied by the bath, means to vibrate the heater at 1,000-20,000 cycles per second, and means to heat the heater to the fining temperature of glass.

5. Apparatus for glassmaking including a furnace having a fining zone and comprising a tank for holding molten glass, a glass furnace heater extending through a part of said tank into the glass in the furnace, means to heat the heater to glassmaking temperature, and means to vibrate the heater.

6. The apparatus of claim 5 in which the heater carries an electrical current.

7. The apparatus of claim 5 in which the heater is an internally flame heated tube.

8. The apparatus of claim 5 in which the heater is an electrical induction unit.

9. A glassmaking furnace having a fining zone and in the fining zone of the furnace, a carbon electrode placed to bring an electric current into the molten glass, said electrode having a part external to the glass, and means for imparting vibrations of high frequency of 1,000-20,000 cycles per second to said electrode whilst current is so delivered, said means including a magnetostrictive device applied to a part of the electrode external to the glass.

10. The process of glassmaking that includes the steps of internally heating a glass bath by heating means immersed in the glass, and internally, simultaneously introducing vibrations of sound wave type to the glass by vibrating the part of the heating means immersed in the glass at a frequency of about sound wave magnitude.

11. The process of glassmaking that includes the step of applying to a glass bath simultaneous heating and vibrations by the action of an element immersed in the glass bath which is at one and the same time a heating element and an element which is caused to vibrate.

12. The process of glass making that includes the step of subjecting molten glass simultaneously to heating and vibration by the action of at least one element immersed in the glass which is at one and the same time a heating body and a body which is caused to vibrate at a high frequency in ultra-sonic ranges.

13. A glassmaking furnace comprising a tank having walls, an electrode extending through a wall into the tank, and means to impart vibrations to said electrode, comprising a high frequency vibrator attached to the part of the electrode outside the tank.

14. Glassmaking apparatus comprising a tank for holding molten glass, an electrode to bring an electric current into the portion of the tank occupied by the molten glass, and magneto-strictive means mounted on said electrode capable of developing vibrations in the range 10,000–20,000 cycles per second in said electrode.

15. Glassmaking apparatus comprising a tank, a heating element mounted at its midlength in the tank wall and immersed at one end in the glass bath, and vibrator means mounted on the external part of the heating element having a range of 10,000–20,000 cycles per second.

16. In the manufacture of glass, a process of fining molten glass that includes subjecting the molten glass simultaneously to fining temperature and vibration by the action of at least one heating body which vibrates in the glass at 10,000 to 20,000 cycles per second.

17. Apparatus for glassmaking that includes a container for fused glass, a heater at least partly submerged in the molten glass, and vibrating means for the heater external to the container.

18. A glassmaking furnace having a fining zone and in the fining zone of the furnace an electrode placed to bring an electric current into the molten glass, said electrode having a part external to the glass, and means for imparting vibrations of high frequency to said electrode whilst current is so delivered, said means including a magneto-strictive device applied to a part of the electrode external to the glass.

IVAN PEYCHES.
EDOUARD VIRGILE BOREL.

References Cited in the file of this patent

UNITED STATES PATENTS

| Number | Name | Date |
|---|---|---|
| 954,804 | Hiorth | Apr. 12, 1910 |
| 1,615,842 | Hitner | Feb. 1, 1927 |
| 1,939,712 | Mahoux | Dec. 19, 1933 |
| 2,014,082 | Fox | Sept. 10, 1935 |
| 2,071,260 | Holden | Feb. 16, 1937 |
| 2,101,675 | Ferguson | Dec. 7, 1937 |
| 2,198,304 | Cornelius | Apr. 23, 1940 |
| 2,222,906 | Hentzen | Nov. 26, 1940 |
| 2,263,549 | Peyches | Nov. 18, 1941 |
| 2,274,986 | Kilian et al. | Mar. 3, 1942 |
| 2,354,807 | Fox et al. | Aug. 1, 1944 |
| 2,403,301 | Richon | July 2, 1946 |
| 2,470,741 | Gordon | May 17, 1949 |

FOREIGN PATENTS

| Number | Country | Date |
|---|---|---|
| 502,113 | Germany | July 10, 1930 |

OTHER REFERENCES

16 Glastech Ber. No. 7, 1938.

Young and Kersten: Journal of Chemical Physics, July 1936, vol. 4, pp. 426, 427.